UNITED STATES PATENT OFFICE.

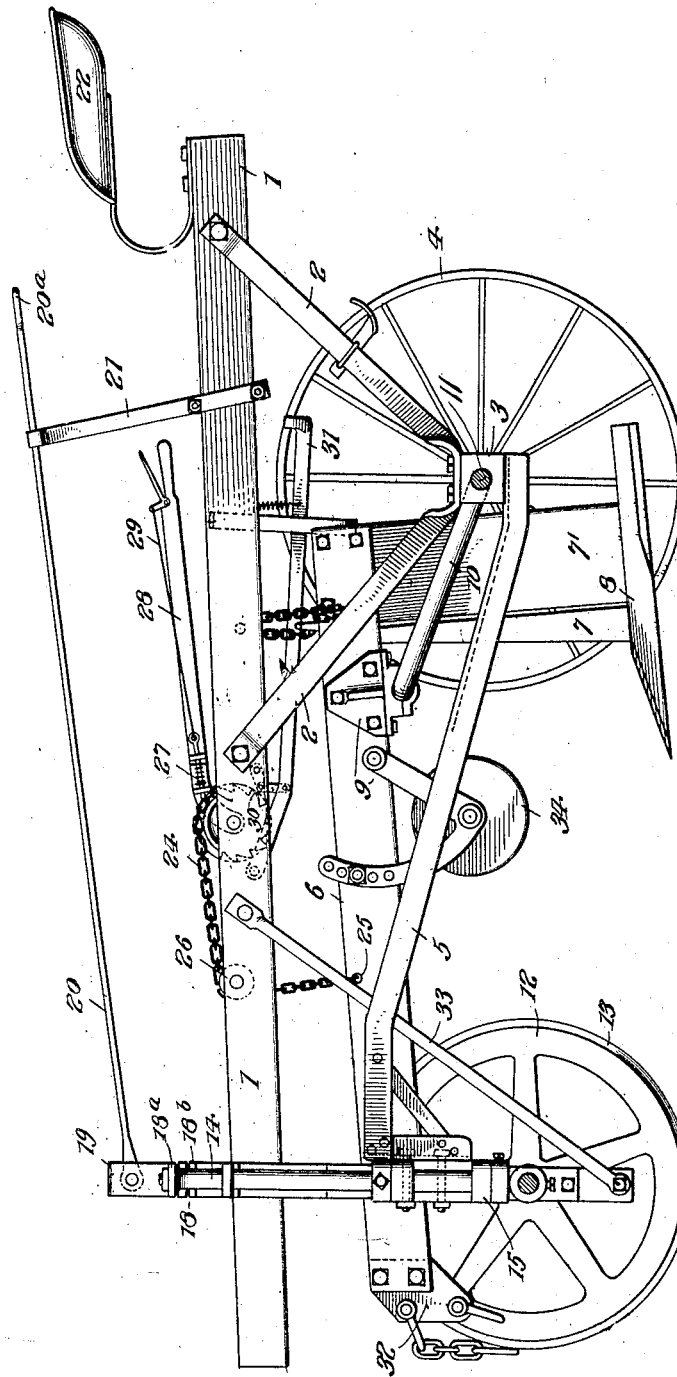

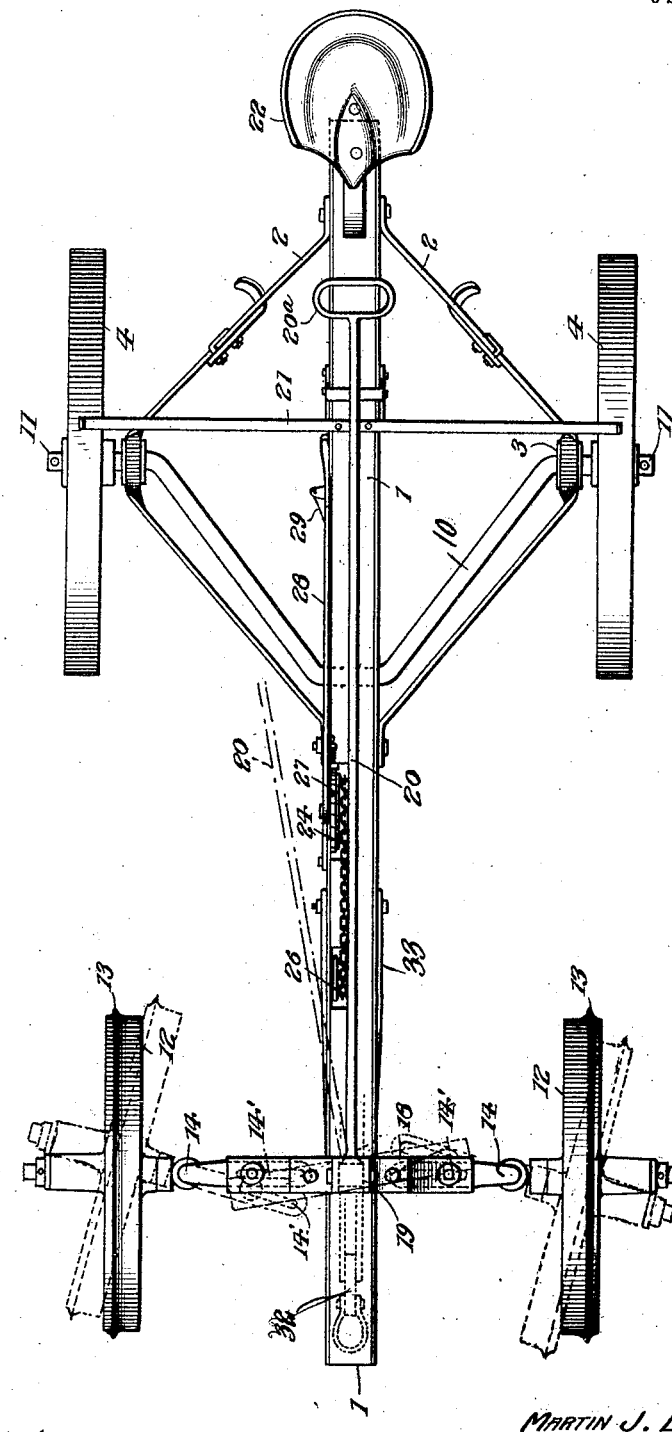

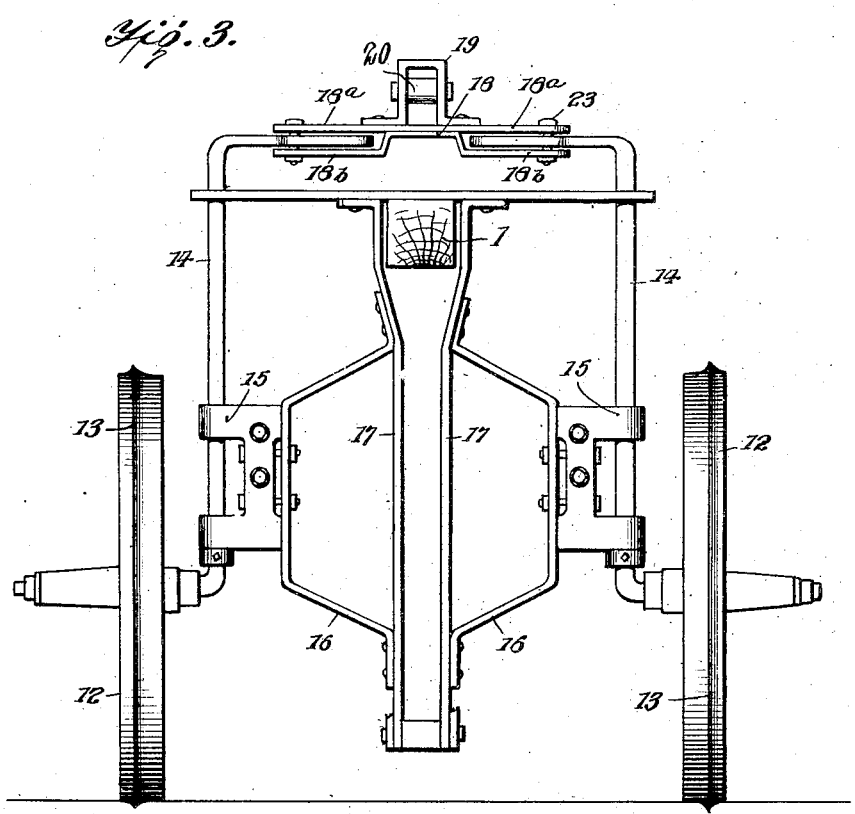

MARTIN J. ELY, OF OXNARD, CALIFORNIA, ASSIGNOR OF ONE-HALF TO JAMES A. DRIFFILL, OF OXNARD, CALIFORNIA.

BEET-HARVESTER.

933,026.  Specification of Letters Patent.  Patented Aug. 31, 1909.

Application filed September 22, 1908. Serial No. 454,194.

*To all whom it may concern:*

Be it known that I, MARTIN J. ELY, a citizen of the United States, and a resident of Oxnard, in the county of Ventura and State of California, have made certain new and useful Improvements in Beet-Harvesters, of which the following is a specification.

My invention relates to improvements in beet plows and consists of the combinations, constructions and arrangements of parts herein described and claimed. The use of devices of this kind upon hard soil is often attended by a great loss of beets due to the fact it is very difficult to keep the plow in the ground. This results in a large proportion of the beets being left in the ground and the consequent loss to the farmer.

One object of my invention is to provide a device in which the plow can be raised or lowered and locked in either position so that when the digger is being used and the plow is locked in its lowered position, it cannot be lifted therefrom without lifting the entire weight of the whole frame of the machine together with the wheels and the weight of the driver.

A further object of my invention is to provide a steering means for a beet digger so as to enable the driver to accurately guide the machine so that all of the beets may be lifted.

Other objects and advantages will appear in the following specification and will be particularly pointed out in the appended claims.

My invention is illustrated in the accompanying drawings in which—

Figure 1 is a side view of the device; Fig. 2 is a top view; and Fig. 3 is a front end view.

Referring now to Fig. 1, I have shown therein a main beam 1 to which are secured the various operating parts. These embrace the L-shaped frame pieces 2, attached to the beam 1, at their upper ends. The boxes 3 for the axles of the rear wheels 4 are secured to the central part of the L-shaped frame members 2 and are also connected by means of the bar 5 to the casting 15 as clearly shown in Fig. 1.

The plow beam 6 is provided at its rear end with the standing colter 7 and the standard 7' for the plow 8, which is rigidly attached thereto in the usual manner. Attached to the plow beam at 9 is the boxing for the crank axle 10 whose outwardly turned ends 11 constitute the journals of the wheels 4. The crank axle 10 provides means for supporting the plow beam and permitting its adjustment as will be hereinafter explained.

The front wheels 12 of the device are of heavy castings and are provided with a flange 13 which constitutes a sharp tire surface to aid in the steering of the machine. The wheels 12 are journaled on the Z-shaped rods 14 which constitute swivel standards. These rods are mounted for rotation in castings 15 which are secured upon the U-shaped frame pieces 16 as clearly shown in Fig. 3. The latter members are in turn secured to vertical bars 17 which constitute guide members for the plow beam as well as supporting members for the bearings of the swivel standards 14. The inwardly turned upper ends of the swivel standards 14 are slotted at 14' as shown in Fig. 2. These ends are arranged to enter between the forks 18$^a$ and 18$^b$ of a connecting member 18, which is pivotally attached by means of a yoke 19 to a steering lever 20, the latter extending from the front wheels toward the rear and being supported upon an upright member 21 and terminating in a handle 20$^a$ in a convenient position for manipulation from the driver's seat 22, which is supported at the end of the beam 1 in the usual manner. A pair of bolts 23 are secured to the forks 18$^a$ and 18$^b$ and pass through the slots 14' in the ends of the swivel standards 14.

It will be seen by this construction that when the steering lever is shifted to the right or to the left the standards will be turned in their bearings in the same directions as indicated in Fig. 2 thus turning the wheels at the same angle.

In order to raise and lower the plow I have provided a chain 24 which is attached to the plow beam 6 at 25. The chain passes over an idler 26 pivoted in the beam 1 and is wound around a ratchet wheel 27 also rotatably mounted on the beam 1. The ratchet wheel is arranged to be turned by means of a lever 28 secured thereto and which has a locking mechanism 29 of the ordinary kind. The ratchet is provided with a retaining dog 30 which may be released by means of the foot lever 31 which is pivoted to the beam 1. It will be seen that with the mechanism just described the plow beam 6 may be raised or lowered by means of the lever 28. The usual draft appliances 32 are attached to the forward end of the plow beam, and the brace 33 is for the purpose of providing a lateral stiffening member. The colter 34 is adjustably mounted upon the plow beam 6 as is clearly indicated in Fig. 1.

From the foregoing description of the various parts of the device the operation thereof may be readily understood. When the digger is being used the hand lever 28 is unlocked and the foot lever 31 is depressed thus letting the plow beam 6 descend. This throws the crank axle 10 down below the hub of the wheel 4. With the crank axle in this position the plow cannot come out of the ground for to do so it must move forward. Moreover, by the means thus described the plow is locked in position and can only rise by lifting the whole frame together with the wheels and the weight of the man who is driving the machine.

I am aware that other forms of the device based upon the same general idea might be made, but I consider as my own and desire to claim all such modifications as fairly fall within the spirit and scope of the invention.

I claim:

1. In a plow, a frame, a movable plow beam mounted on said frame, a pair of U-shaped castings, guide members for said plow secured to said castings, Z-shaped swivel standards mounted for rotation in said castings, the lower arms of said standards constituting bearings for the front wheels, the upper arms being turned inwardly and having longitudinal slots therein, a forked cross member provided with stationary bolts arranged to enter said slots and to slide therealong, and a lever secured to said cross member for operating the latter.

2. In a plow, a frame, a movable plow beam mounted on said frame, a pair of castings, guide members for said plow secured to said castings, swivel standards mounted for rotation in said castings, a portion of said standards constituting bearings for the wheels, another portion of said standards being turned inwardly and having slots therein, a cross member provided with stationary bolts arranged to enter said slots and to slide therein, and means for operating said cross member.

MARTIN J. ELY.

Witnesses:
 GEO. E. MORRILL,
 HELEN HIGGINS.